US012694086B2

(12) United States Patent (10) Patent No.: US 12,694,086 B2

Hafeneger et al. (45) **Date of Patent: \*Jul. 28, 2026**

---

(54) ELECTRONIC DEVICE SYSTEM WITH RING DEVICES

(71) Applicant: Apple Inc., Cupertino, CA (US)

(72) Inventors: Stefan Hafeneger, Saratoga, CA (US); Craig C Leong, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,302

(22) Filed: Jul. 11, 2024

(65) Prior Publication Data

US 2024/0362312 A1     Oct. 31, 2024

Related U.S. Application Data

(63) Continuation of application No. 17/089,489, filed on Nov. 4, 2020, now Pat. No. 12,061,680.

(Continued)

(51) Int. Cl.

| | |
|---|---|
| *G06F 21/32* | (2013.01) |
| *G06F 3/033* | (2013.01) |
| *G06F 3/16* | (2006.01) |
| *G06V 10/22* | (2022.01) |
| *G06V 20/20* | (2022.01) |
| *G06V 40/10* | (2022.01) |
| *G06V 40/13* | (2022.01) |

(Continued)

(52) U.S. Cl.

CPC .............. *G06F 21/32* (2013.01); *G06F 3/033* (2013.01); *G06F 3/165* (2013.01); *G08C 17/02* (2013.01); *G06F 2203/0331* (2013.01); *G06V 10/235* (2022.01); *G06V 20/20*

(2022.01); *G06V 40/10* (2022.01); *G06V 40/13* (2022.01); *G06V 40/19* (2022.01); *G08C 2201/61* (2013.01)

(58) Field of Classification Search

CPC .......... G06F 21/32; G06F 3/033; G06F 3/165; G06F 2203/0331; G06F 3/011; G06F 3/013; G06F 3/014; G06F 3/016; G06F 3/017; G08C 17/02; G08C 2201/61; G06V 10/235; G06V 20/20; G06V 40/10; G06V 40/13; G06V 40/19

See application file for complete search history.

(56) References Cited

U.S. PATENT DOCUMENTS

| | | |
|---|---|---|
| 9,258,036 B1 | 2/2016 | Ting |
| 9,313,609 B2 | 4/2016 | Prencipe |

(Continued)

*Primary Examiner* — Abhishek Sarma

(74) *Attorney, Agent, or Firm* — Treyz Law Group, P.C.; Kendall P. Woodruff

(57) ABSTRACT

Electronic devices in a system may be controlled by a user. The user may have one or more wearable devices or other devices. A user's device may be used by the user in identifying a target electronic device of interest among the electronic devices in the system. The target electronic device may be identified using a gaze tracking sensor that senses the user's point-of-gaze, an orientation sensor that detects a direction in which the user's device is pointed, or other sensor circuitry. Visual feedback, audio feedback, and/or haptic feedback may be provided to the user to confirm which electronic device has been identified as a target electronic device of interest. User input may be gathered by sensors and used in adjusting operating parameters in the target electronic device of interest. Health monitoring operations and other operations may also be performed.

19 Claims, 8 Drawing Sheets

Related U.S. Application Data

(60) Provisional application No. 62/978,387, filed on Feb. 19, 2020.

(51) Int. Cl.
    G06V 40/19        (2022.01)
    G08C 17/02        (2006.01)

(56)           References Cited

U.S. PATENT DOCUMENTS

| | | |
|---|---|---|
| 9,582,034 B2 | 2/2017 | Von Badinski et al. |
| 2014/0118631 A1 | 5/2014 | Cho |
| 2014/0279528 A1 | 9/2014 | Slaby et al. |
| 2015/0062086 A1 | 3/2015 | Nattukallingal |
| 2015/0193018 A1 | 7/2015 | Venable et al. |
| 2015/0261293 A1 | 9/2015 | Wilairat et al. |
| 2015/0277559 A1 | 10/2015 | Vescovi et al. |
| 2016/0213267 A1 | 7/2016 | Laakkonen et al. |
| 2016/0216761 A1* | 7/2016 | Klingström ......... G06F 3/04883 |
| 2016/0349803 A1 | 12/2016 | Dusan |
| 2017/0012972 A1 | 1/2017 | Tanaka et al. |
| 2017/0132946 A1 | 5/2017 | Kinnunen et al. |
| 2018/0067621 A1 | 3/2018 | Bailey et al. |

\* cited by examiner

ELECTRONIC DEVICE SYSTEM WITH RING DEVICES

This application is a continuation of U.S. patent application Ser. No. 17/089,489, filed Nov. 4, 2020, which claims the benefit of U.S. provisional patent application No. 62/978,387, filed Feb. 19, 2020, both of which are hereby incorporated by reference herein in their entireties.

FIELD

This relates generally to electronic devices, and, more particularly, to systems of electronic devices.

BACKGROUND

Items such as electronic devices may have displays, speakers, and other components. These components may provide output to a user. In some systems, controllers are provided to allow a user to adjust the operation of system components.

If care is not taken, controllers may not be ergonomic or may not perform as expected. These shortcomings may make it difficult for a user to interact with electronic equipment.

SUMMARY

Electronic devices in a system may be controlled by a user. The user may have one or more wearable devices and/or other electronic devices. The devices may include sensors for gathering input and output devices such as displays, speakers, and haptic output components.

A user's device may be used in identifying a target electronic device of interest among the electronic devices in the system. The target electronic device may be identified using a gaze tracking sensor that senses the user's point-of-gaze, a radio-frequency sensor that detects a direction in which the user's device is pointed, or other sensor circuitry for detecting pointing input, gestures, and other user input.

Visual feedback, audio feedback, and/or haptic feedback may be provided to the user to confirm which electronic device has been identified as a target electronic device of interest. User input may be gathered by a touch sensor, force sensor, gesture sensor, or other sensor circuitry in one or more user devices and this user input may be used in adjusting operating parameters in the target electronic device of interest. Health monitoring operations and other operations may also be performed using the user's device(s).

DETAILED DESCRIPTION

Figure 1:
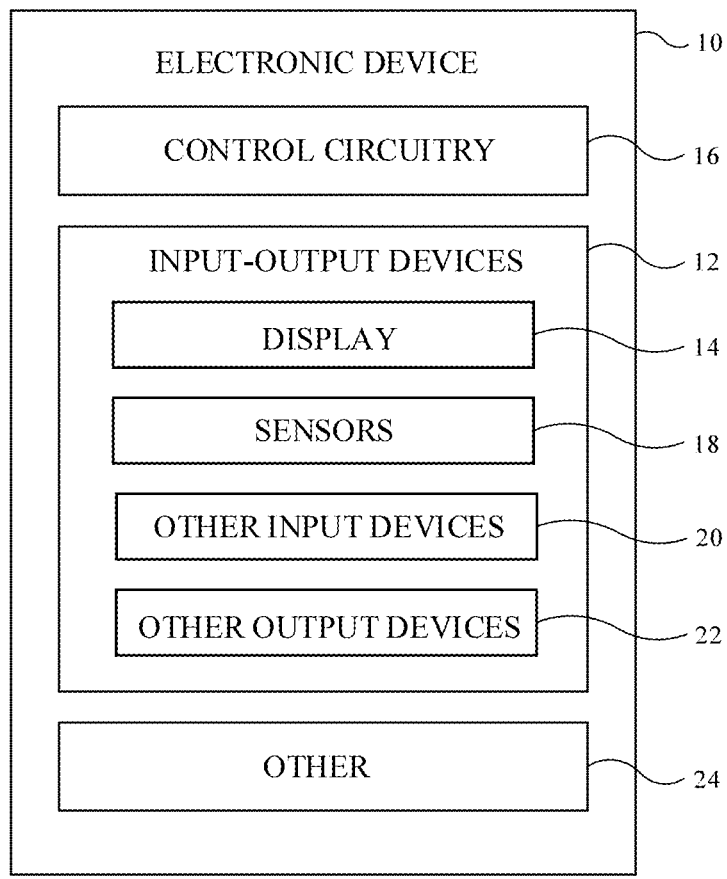
FIG. 1 is a schematic diagram of an illustrative electronic device in accordance with an embodiment.

A system may include one or more items that interact with each other. The items may be electronic devices that interact with each other. As an example, the system may have a device with a display such as a cellular telephone, computer, television, or head-mounted device, a pair of headphones or other device with a speaker, a voice-controlled countertop speaker, earbuds, a television, a computer, a head-mounted device with speakers, or other devices that produce audio output, lights, thermostats, household appliances, or other household devices, and/or other electronic devices. The system may include wearable devices such as a wristwatch, ring device, head-mounted device, or other equipment worn on a user's finger, wrist, arm, head, or other body part. The devices in the system may communicate with each other. For example, wireless communications circuitry may be used to convey information between devices in the system. This allows devices to control each other.

Devices with displays may display content for a user. Devices with audio components may provide audible output. Equipment that contains haptic output devices may use the haptic output devices to provide a user with haptic output. Environmental data (ambient light measurements, environmental temperature measurements, humidity readings, etc.) and user input may be gathered using sensors.

If desired, a device may be operated in isolation. For example a wearable device that is operating in a stand-alone operating mode may perform health monitoring operations. Gathered health data may or may not be shared with other devices. In other scenarios, the system may use one or more electronic devices to gather input from the user to control the operation of one or more electronic devices. In this type of scenario, a user may, for example, provide input to one device that causes one or more additional devices to take particular actions. A user may, for example, provide touch input, gesture input, force input, or button press input with a first device that is used to control content that is being displayed on a display, audio that is being played with a speaker, and/or haptic output that is being generated with a haptic output device in a second device. Additional devices (e.g., a third device) may be used to provide additional processing power and/or to facilitate communications and/or coordination between devices. For example, a third device may receive the user input from the first device and may be used in controlling the second device based on the received user input from the first device. In general, both direct and indirect control schemes may be used.

During operation, a ring worn on a user's finger may, if desired, be used in gathering information on interactions between the user's finger and the system in addition to tracking movement of the finger and other user interactions. For example, circuitry in a ring may be used to capture real-time readings on the location (e.g., the position in three dimensions), orientation (e.g., the angular orientation), and motion (e.g., the change in position as a function of time) of the ring. These activities may be used in controlling devices in the system.

An illustrative electronic device is shown in FIG. 1. Electronic device 10 of FIG. 1 may be a computing device such as a laptop computer, a computer monitor containing an embedded computer (e.g., a desktop computer formed from a display with a desktop stand that has computer components embedded in the same housing as the display), a tablet computer, a cellular telephone, a media player, or other handheld or portable electronic device, a smaller device such as a wristwatch device, a pendant device, a headphone or earpiece device, a device embedded in eyeglasses or other equipment worn on a user's head (e.g., a helmet, goggles, hat, or other head-mounted device), a finger-mounted device such as a ring worn on a user's finger or a finger-mounted device with a U-shaped housing that is worn on a user's finger while leaving part of the finger (e.g., a finger pad of the finger) exposed, a glove, a wristband, an armband, or other wearable or miniature device, a television, a computer display that does not contain an embedded computer, a countertop device with a voice-controlled speaker and optionally a display, a gaming device, a navigation device, a tower computer, a set-top box (e.g., equipment coupled to a display device such as a television), an accessory such as a mouse, joystick, or keyboard, an item of furniture with electrical components, clothing with circuitry, an embedded system such as a system in which electronic equipment is mounted in a kiosk or automobile, a household item such as a light, a thermostat, dishwasher, coffeemaker, or other appliance, window blinds, door locks, or other household device, a remote control, a stereo system, equipment that implements the functionality of two or more of these devices, or other electronic equipment. If desired, device 10 may be a removable external case for electronic equipment, may be a band or may include a band (e.g., a wristband or headband), may be a removable cover for a device, or may be any other suitable electronic device.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include wired and/or wireless communications circuitry (e.g., antennas and associated radio-frequency transceiver circuitry such as cellular telephone communications circuitry, wireless local area network communications circuitry, near-field communications circuitry, etc.). The communications circuitry of control circuitry 16 may allow device 10 to communicate with other electronic devices (e.g., other devices such as device 10). For example, control circuitry 16 (e.g., communications circuitry) may be used to allow wired and/or wireless control commands and other communications to be conveyed directly and/or indirectly between devices such as cellular telephones, tablet computers, laptop computers, desktop computers, televisions, head-mounted devices, handheld controllers, finger devices, wristwatch devices, other wearable devices, keyboards, computer mice, remote controls, speakers, accessory displays, accessory cameras, and/or other electronic devices 10.

Input-output circuitry in device 10 such as input-output devices 12 may be used to allow data to be supplied to device 10 and to allow data to be provided from device 10 to external devices. Input-output devices 12 may include input devices that gather user input and other input and may include output devices that supply visual output, audible output, haptic output, or other output.

Input-output devices 12 may include one or more displays such as display 14. Devices 12 may, for example, include an organic light-emitting diode display, a liquid crystal display, a projector display (e.g., a projector based on a micromechanical systems device such as a digital micromirror device or other projector components), a scanning mirror device, a display having an array of pixels formed from respective light-emitting diodes (e.g., a pixel array having pixels with crystalline light-emitting diodes formed from respective light-emitting diode dies such as micro-light-emitting diode dies), and/or other displays. Display 14 may be a touch screen display that includes a touch sensor for gathering touch input from a user or display 14 may be a touch insensitive display that is not sensitive to touch.

In addition to display 14, output may be provided using other output devices 22. These devices may include, for example, light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices. Light-emitting devices may serves as flashlights, status indicator lights, or as markers. For example, infrared light-emitting diodes may serve as infrared markers that are detected by an infrared image sensor in a head-mounted device (e.g., to provide the head-mounted device and/or other system equipment with the ability to track the location of the markers as a device containing the markers is moved about by a user).

Input-output devices 12 may also include sensors 18. Sensors 18 may include force sensors (e.g., strain gauges, capacitive force sensors, resistive force sensors, optical force sensors, etc.), audio sensors such as microphones, touch and/or proximity sensors such as capacitive sensors (e.g., a two-dimensional capacitive touch sensor integrated into display 14, a two-dimensional capacitive touch sensor and/or a two-dimensional force sensor overlapping display 14, and/or a touch sensor or force sensor that forms a button, trackpad, or other input device not associated with a display), heart-rate sensors (e.g., optical heart-rate sensors that emit light and detect this light after it has passed through a user's flesh), blood oxygen sensors such as optical blood oxygen sensors, electrocardiogram sensors, other health sensors, and other sensors. Touch sensors for display 14 or for other touch sensors may be based on an array of capacitive touch sensor electrodes, acoustic touch sensor structures, resistive touch components, force-based touch sensor structures, a light-based touch sensor, or other suitable touch sensor arrangements. If desired, display 14 may have a force sensor for gathering force input (e.g., a two-dimensional force sensor may be used in gathering force input on display 14).

If desired, sensors 18 may include optical sensors such as optical sensors that emit and detect light, ultrasonic sensors, optical touch sensors, optical proximity sensors, and/or other touch sensors and/or proximity sensors, monochromatic and color ambient light sensors, visible light image sensors, infrared image sensors (e.g., thermal image sensors), fingerprint sensors, temperature sensors (e.g., thermal sensors that sense contact by fingers and other user body parts by measuring temperature changes), sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information such as information on the orientation of the sensor and distance of the sensor relative to a device that emits associated radio-frequency signals, Bluetooth® circuitry that performs location and tracking operations using angle-of-arrival and angle-of departure information, sensors using ultra-wideband radio technology to perform indoor positioning using time-of flight information, other radio-frequency sensors that use time-of-flight information, radio-frequency sensors that gather three-dimensional radio-frequency images, and/or radio-frequency sensor circuitry that gathers other information using radar principals or other radio-frequency sensing techniques), depth sensors (e.g., structured light sensors and/or depth sensors based on stereo imaging devices that capture three-dimensional images and/or gather other three-dimensional data), optical sensors such as self-mixing sensors and light detection and ranging (lidar) sensors that gather time-of-flight measurements, humidity sensors, moisture sensors, pressure sensors, gaze tracking sensors that track a user's point-of-gaze and/or eye motion relative to a user's head, retinal scanning sensors that gather biometric information such as information on a user's unique pattern of blood vessels in the user's retina, iris scanning, and/or other eye-based biometric authentication sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

Device 10 may include other input devices 20. Devices 20 may include mechanical devices for gathering input such as buttons, joysticks, scrolling wheels, key pads, keyboards, and other devices for gathering user input. These mechanical devices, which may sometimes include depressible switches, may sometimes be referred to as mechanical sensors, button press sensors, or sensors. During operation, device 10 may use sensors 18 and/or other input-output devices such as devices (sensors) 20 to gather user input (e.g., buttons may be used to gather button press input, touch and/or force sensors overlapping displays can be used for gathering user touch screen input and/or force input, touch pads and/or force sensor may be used in gathering touch and/or force input, microphones may be used for gathering audio input, etc.).

If desired, electronic device 10 may include additional components 24. These components may include, for example, a battery or other energy storage device, connector ports for supporting wired communications with ancillary equipment and for receiving wired power, and other circuitry. Devices 10 may serve as accessories and/or may include wired and/or wireless accessories (e.g., keyboards, computer mice, remote controls, trackpads, etc.).

The components of device 10 may be mounted in a housing. The housing may have any suitable shape. For example, the housing may be configured to be handheld (e.g., to be held in a user's hand) and/or may have other configurations. Housing structures (e.g., housing walls, internal support structures, etc.) may be formed from polymer, metal, glass, fabric, crystalline materials such as sapphire, ceramic materials, other materials, and/or combinations of these materials. Electrical components (e.g., control circuitry, input-output devices, etc.) may be mounted in an interior portion of the housing, may include structures mounted on exterior surfaces or near exterior surfaces of a housing, may operate through housing windows and other transparent housing structures, and/or may otherwise be supported within the housing of device 10.

Illustrative electronic devices are shown in FIGS. 2, 3, 4, 5, and 6. These devices and/or other electronic devices may be used in a system, if desired.

Figure 2:
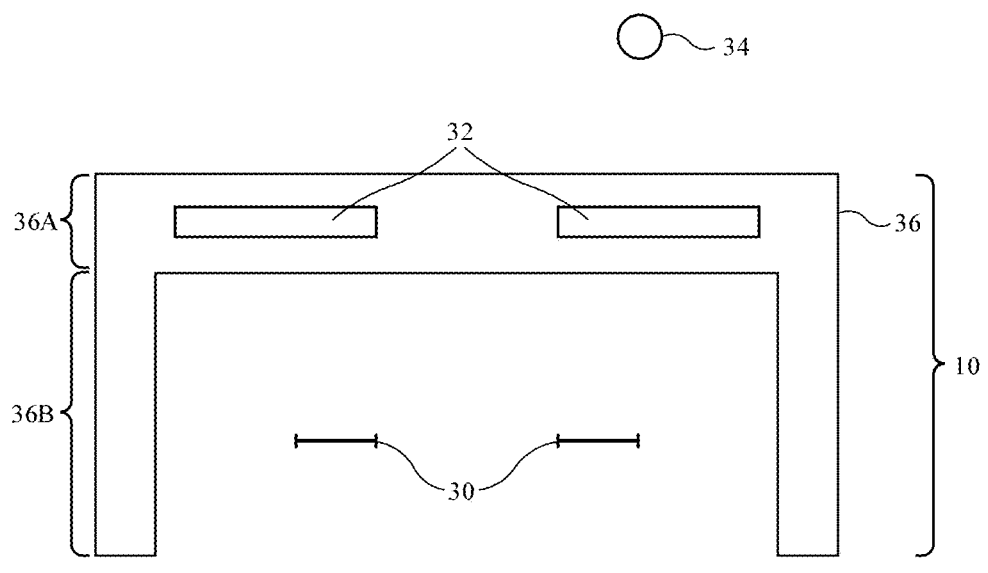
FIG. 2 is a top view of an illustrative head-mounted electronic device in accordance with an embodiment.

In the illustrative example of FIG. 2, device 10 is a head-mounted device having head-mounted device housing 36. Housing 36 may have a main portion such as portion 36A and temples or other portions 36B that are configured to mount device 10 to a user's head. Housing 36 may have the shape of a pair of glasses, goggles, a helmet, and/or other housing configured to be worn on a user's head.

Device 10 of FIG. 2 may have internal components 32. Components 32 may include input-output devices 12, circuitry 16, and/or other devices 24, as described in connection with FIG. 1. Components 32 may, for example, include speakers. Speakers may be included in portions of housing 36 such as housing portions 36B (e.g., so that sound may be provided to a user's ears while blocking or optionally not blocking ambient sounds). Components 32 may also include a display and an optical system (e.g., lenses) for displaying images for a user when a user's eyes are located in eye boxes 30. The images may be movies, text, icons or other graphical images, video game images, content with a mixture of real-world objects and virtual objects, and/or other images.

A head-mounted device such as device 10 of FIG. 2 may include eye tracking sensors. These sensors may gather readings of the user's iris (e.g., using an image sensor that captures an image of the iris), retina (e.g., using a user-facing image sensor that captures an image of the retina, sometimes referred to as a retinal scan), and/or other biometric information to identify (authenticate) a user. These sensors may also measure the locations of glints on the user's eye and/or the location of the user's retina to determine the direction of the user's view (e.g., the user's point of gaze). User pointing input such as information on the direction in which a user is viewing real-world and virtual objects and the time that a user's point of gaze dwells in a particular direction can be used to control device 10 and other equipment.

In some configurations, a head-mounted device such as device 10 of FIG. 2 may exclusively display images that are presented on a pixel array within device 10 and may prevent any user viewing of real-world objects such as real-world object 34 by a user. If desired, this type of head-mounted device may display real-world objects to a user by using a forward-facing camera to capture real-time images of the user's surroundings. Real-world content gathered using a camera can be displayed alone or in combination with computer-generated content (e.g., computer-generated content can be overlaid over camera images of the real world so that a user may view a mixture of real-world objects and virtual objects. Some head-mounted devices may have beam splitters or other optical combiners. An optical combiner may be used to combine real-world images (light from the real-world surrounding the user) with computer-generated images that are presented on a display in device 10. This allows computer-generated images to be overlaid optically on real-world content. In general, device 10 may present computer-generated content (virtual image content) and/or real-world content (real-world images).

Figure 3:
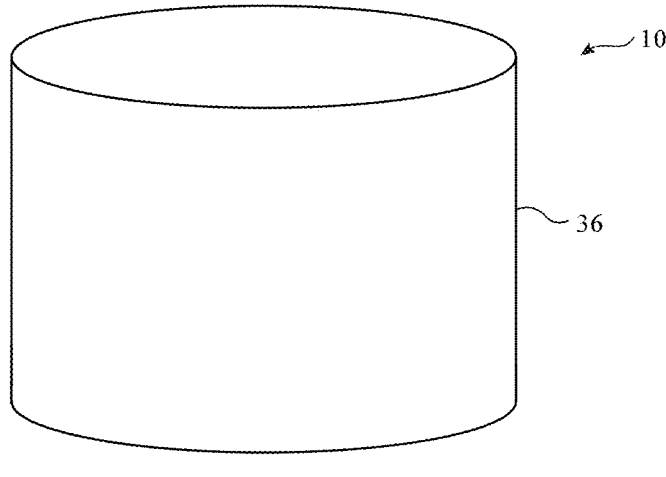
FIG. 3 is a perspective view of an illustrative electronic device with a speaker in accordance with an embodiment.

FIG. 3 is a perspective view of device 10 in an illustrative configuration in which device 10 has a housing such as housing 36 that contains a speaker. Device 10 of FIG. 3 may be, for example, a countertop device such as a voice-controlled countertop speaker (with or without an optional display). If desired, device 10 may be a stand-alone pair of speakers such as a wearable pair of headphones, a pair of ear buds, or other wearable speakers. The audio content that is played back by the speaker(s) of device 10 may be based on content that is stored locally in storage in device 10, content that is received via a wired or wireless link from other device(s) 10, internet content or other streamed content from a remote server, and/or may be audio that is obtained from other audio sources. Audio may be provided as part of an audio-video data item (e.g., as part of a wireless video stream or locally played back video file) or may be provided without accompanying video.

Figure 4:
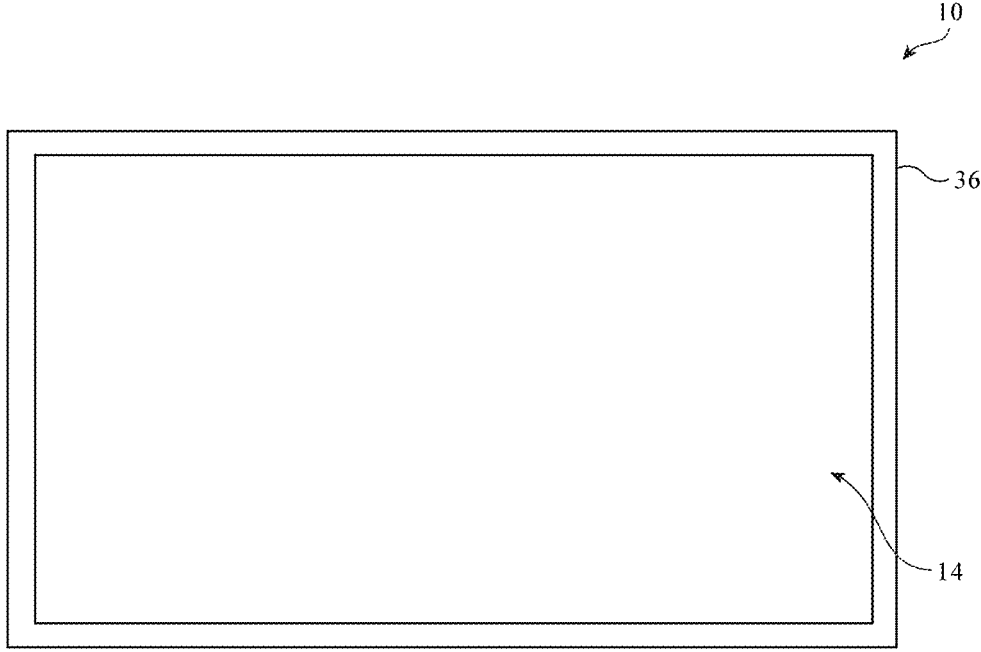
FIG. 4 is a front view of an illustrative electronic device with a display in accordance with an embodiment.

In the example of FIG. 4, device 10 includes a display such as display 14. Display 14 may be mounted in housing 36. Housing 36 may be a laptop housing, a television housing, a cellular telephone housing, a wristwatch ousting, or other device housing. Device 10 of FIG. 4 may include a speaker for presenting an audio portion of audio-video content.

Figure 5:
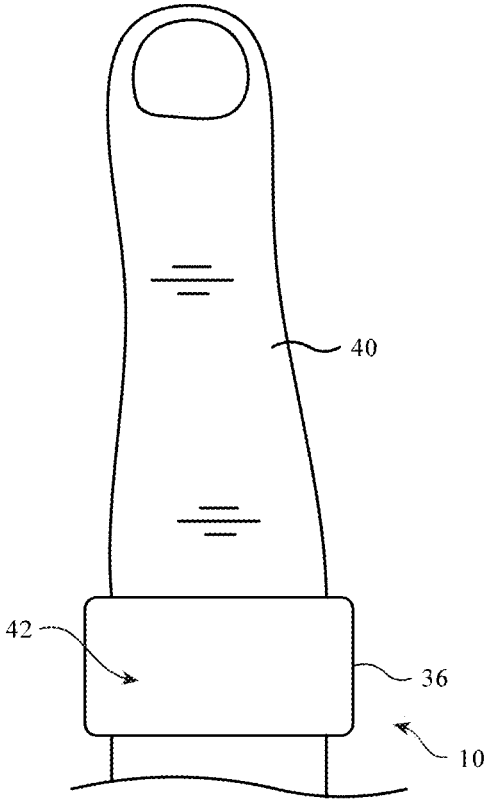
FIG. 5 is a top view of an illustrative finger-mounted electronic device such as a ring device in accordance with an embodiment.
Figure 6:
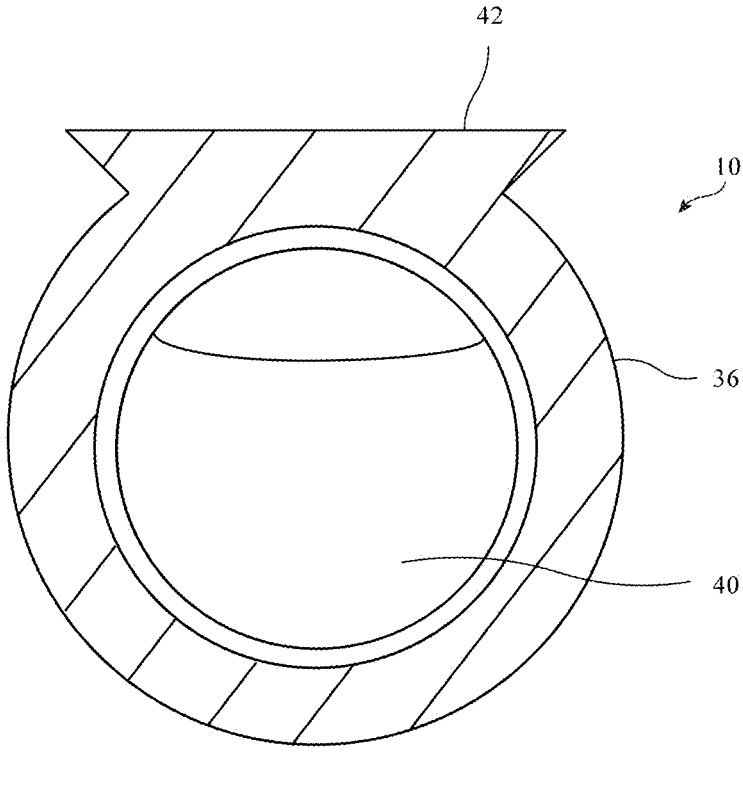
FIG. 6 is an end view of the illustrative device of FIG. 5 in accordance with an embodiment.

FIG. 5 is a top view of device 10 in an illustrative arrangement in which housing 36 is configured to form a ring that is worn on a user's finger such as finger 40 (e.g., the user's ring finger or other finger). FIG. 6 is an end view of device 10 of FIG. 5. Top portion 42 of housing 36 or other portions of device 10 of FIGS. 5 and 6 may overlap one or more sensors. For example, portion 42 may overlap a fingerprint sensor for gathering user fingerprints (e.g., for user authentication), portion 42 and/or other exposed portions of the outer surface of housing 36 may overlap a touch sensor for gathering one-dimensional or two-dimensional touch input, may overlap a force sensor for gathering force input, and/or may overlap other sensors. Ring devices such as the illustrative ring of FIGS. 5 and 6 may include radio-frequency sensor circuitry, inertial measurement unit circuitry, and/or other sensor circuitry to gather information on the position of finger 40 (e.g., information on the current location, movement, and/or orientation of finger 40). This information can be gathered in three dimensions so that a user may provide a system with three-dimensional gesture input, may include user pointing input (e.g., input associated with the direction in which finger 40 and device 10 are pointing), may include tap input (e.g., input associated with abrupt striking motions of finger 40 against a surface that can be detected using an accelerometer or other sensor), etc.

If desired, sensor circuitry in the ring (e.g., touch and/or force sensors, etc.) may wrap around some or all of the ring's exposed outer surface. A user may provide finger input to the sensor (e.g., touch and/or force input) using the user's thumb or other finger (e.g., an index finger of an opposing hand from the ring finger on which the ring is being worn). The user may press against a particular location on the sensor (e.g., a particular portion of the outer surface of the ring) or may move a finger along the surface of the ring in one dimension or two dimensions. As an example, a user may move the tip of a finger around the circumference of the ring or may move the fingertip across the ring parallel to the length of the user's finger. As another example, two-directional touch input may be gathered (e.g., as the user moves a finger around the ring and/or across the ring). In this way, the user may provide touch input such as touch gesture input, touch scrolling motions, touch selection input (e.g., tap input), etc. The touch input may be used as pointing control input (e.g., to move a cursor or other visual element in the user's field of view). If desired, multitouch input (e.g., pinch-to-zoom input) may also be gathered using the touch sensor. User input to the ring may be used for scrolling commands, up/down adjustment commands (e.g., for adjusting parameters such as audio playback volume, television channel, etc.), source selection, joystick commands and/or other pointing input, and/or other user input.

Force input may be provided by pressing down on portion 42 or other area of the ring surface. User input gathered using a ring (e.g., touch sensor input, force sensor input, position, orientation, and/or motion sensor input, radio-frequency sensor input on position, orientation, and/or motion, and/or other user input) can be gathered in real time so that the ring can serve as a remote control, pointing device, and/or other controller. By tracking the path followed by a ring or other device in two or three dimensions, an accelerometer and/or other inertial measurement sensor circuitry and/or radio-frequency sensor circuitry may be used in measuring the motion of finger 40 (e.g., to sense letters and other characters that a user traces out with the tip of finger 40, to sense gestures such as gestures in a particular direction, gestures in which a pattern of motion indicates a particular command, etc.).

Sensor(s) in device 10 may be used for health monitoring. For example, a ring that is being worn on a user's finger may gather heart rate information, blood oxygen readings, skin temperature readings, and/or other health data by measuring the user's finger. Electrocardiogram readings may be gathered using a ring. The ring may have a first electrocardiogram electrode on an inner surface that contacts a user's finger on one side of the user's body (e.g., the right side). The ring may also have a second electrocardiogram electrode on an outer surface that can be placed in contact with a user's finger, hand, arm or other exposed skin on an opposing side of the user's body (e.g., the left side). When the electrodes form a circuit through the user's body in this way, electrocardiogram data may be gathered by electrocardiogram sensor circuitry in the ring.

Figure 7:
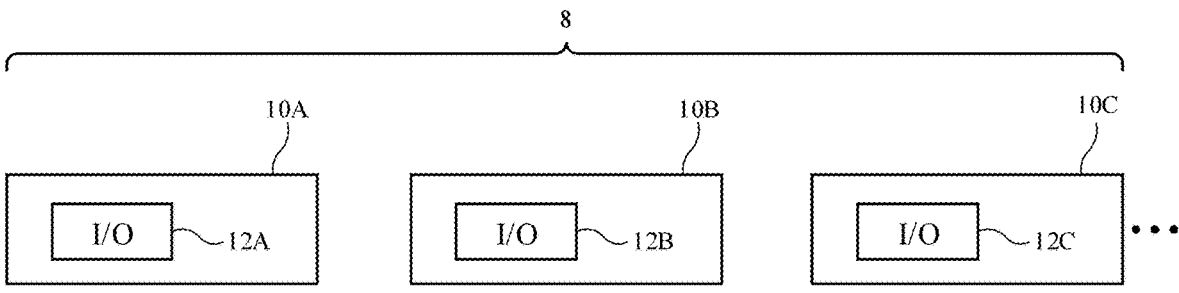
FIG. 7 is a diagram of an illustrative system in accordance with an embodiment.

Electronic devices 10 may be used in a system such as system 8 of FIG. 7. As shown in FIG. 7, system 8 may include one or more electronic devices 10 such as illustrative device 10A (with circuitry of the type shown in FIG. 1 including input/output circuitry 12A), device 10B (with circuitry of the type shown in FIG. 1 including input/output circuitry 12B), device 10C (with circuitry of the type shown in FIG. 1 including input/output circuitry 12C), and/or other illustrative devices 10, each of which may include some or all of the components described in connection with FIG. 1. These devices may communicate using wired and/or wireless communications links.

In some scenarios, a single device 10 (e.g., a ring device or other device) may be used primarily or exclusively in a stand-alone operating mode. For example, device 10A may be a ring or other device that is used to gather heath data as a user sleeps or exercises. Later, the ring or other device 10A may optionally export the health data that has been gathered. For example, a ring may export health data to device 10B, which may be a head-mounted device and/or device 10C, which may be a computer, wristwatch, cellular telephone, or other electronic device 10. In this type of scenario, a display in device 10B (e.g., a head-mounted device display) and/or a display in device 10C may be used in displaying information associated with the exported health data (e.g., the raw health data, statistics summarizing the health data, associated health alerts, etc.).

In other scenarios, multiple devices 10 may operate together in real time. As an example, device 10A may be a ring, device 10B may be a head-mounted device, and device 10C may be a cellular telephone, computer, wristwatch, etc. In this type of scenario, device 10B may use a gaze tracking sensor in circuitry 12B to measure a user's point-of-gaze while using a display in circuitry 12B to display visual content to the user (e.g. computer-generated content overlaid over real-world content, as an example). At the same time, the user may provide input (touch input, touch gestures, taps, three-dimensional ("air") gestures, force input, and/or other input using one or more sensors in input-output circuitry 12A of the ring (device 10A). Devices 10A and 10B may wirelessly communicate with device 10C, which may use its control circuitry to help process the input gathered with circuitry 12A of device 10A and circuitry 12B of device 10B and to take appropriate action (e.g., by providing content to device 10B that is to be displayed on a display in circuitry 12C). In this type of arrangement, device 10C may serve as an intermediary through which user input from device 10A controls output provided to the user with device 10B. If desired, device 10C may use a touch sensor, buttons, force sensor, and/or other input-output circuitry 12C to gather user input during operation of system 8 in addition to or instead of using device(s) 10A and/or 10B to gather input. Devices 10A, 10B, and/or 10C in system 10 may optionally gather voice commands using microphones in circuitry 12A, 12B, and/or 12C.

If desired, device 10C may be omitted from some or all of these operations. For example, control circuitry 16 in device 10B may process input gathered with circuitry 12B in device 10B and input gathered with circuitry 12A in device 10A (that is communicated wirelessly to device 10B) without relying on the processing capabilities of device 10C. By processing this input, the control circuitry of device 10B can take suitable action (e.g., by issuing wireless commands for other devices 10 in system 8, by displaying suitable content on a display in circuitry 12B in response to the input, by presenting audio and/or haptic output in response to input, etc.).

In each of these examples, one or more additional devices 10 may be controlled using devices 10A, 10B, and/or device 10C, if desired.

Consider, as an example, a scenario in which device 10A is a ring, device 10B is a head-mounted device, and optional device 10C is a wristwatch device, cellular telephone, or computer. A user may desire to control an additional electronic device (e.g., a household appliance, a television, a countertop speaker, an additional computer, etc.). The user may control this additional device by looking at the additional device and thereby identifying the device as a target device of interest. In this scenario, gaze tracking circuitry in device 10B detects measures the user's point-of-gaze and thereby identifies which device the user is viewing. The user may then supply input to device 10A (e.g., a fingerprint may be supplied to a fingerprint sensor in the ring, touch and/or force input may be supplied, etc.). This ring input may be used to authenticate the user and may serve as an adjustment command for the additional electronic device. For example, if a user swipe upwards is detected on the ring, a volume up command may be transmitted to the television or other additional device from device 10A via device 10C, from device 10A via device 10B, or directly from device 10A. This volume up command may direct the television or other additional device to adjust its audio playback volume through a speaker in the television or other additional device.

In general, any operating parameter of one or more additional electronic devices may be controlled in this way.

For example, in connection with operating a household item, commands from devices 10A, 10B, and/or 10C may be used in adjusting light output for a light, dishwashing parameters associated with operation of a dishwasher, coffee making parameters associated with a coffeemaker, temperature settings associated with a thermostat, blind up/down settings associated with a window blind, etc.

In connection with operating an additional electronic device such as a television or computer, commands from devices 10A, 10B, and/or 10C may be used to authenticate the user's identity to the additional device (e.g. to unlock a screensaver or otherwise log into a device), to specify a user's identity (e.g., when choosing which user account to use on the additional device), to adjust audio playback settings (volume level, bass and treble settings, mute, etc.), to adjust video playback settings (brightness, contrast, hue, saturation, pause, fast forward, rewind, play, next track, previous track, stop, channel up/down, channel number, channel name, etc.), to adjust an application (e.g., by selecting which application to launch on a television or computer, to adjust settings within a running application), to make a source selection (e.g., by selecting a video input port on a television, by selecting an audio port on a stereo system, by selecting video and/or audio tracks from a library, by selecting whether a speaker should play internal audio or should play an audio stream that is wirelessly transmitted from another external device, and/or by otherwise selecting which audio and/or video content to play back on one or more additional devices in system 8), and/or may be used in taking other suitable action on the additional electronic device(s).

These examples are merely illustrative. In general, system 10 may include any number of devices 10 (one or more) that are used in gathering user input and any number of devices 10 (one or more) that are controlled based on the user input. Moreover, the devices that are used in collecting user input and the devices that are controlled based on the user input need not be mutually exclusive.

Figure 8:
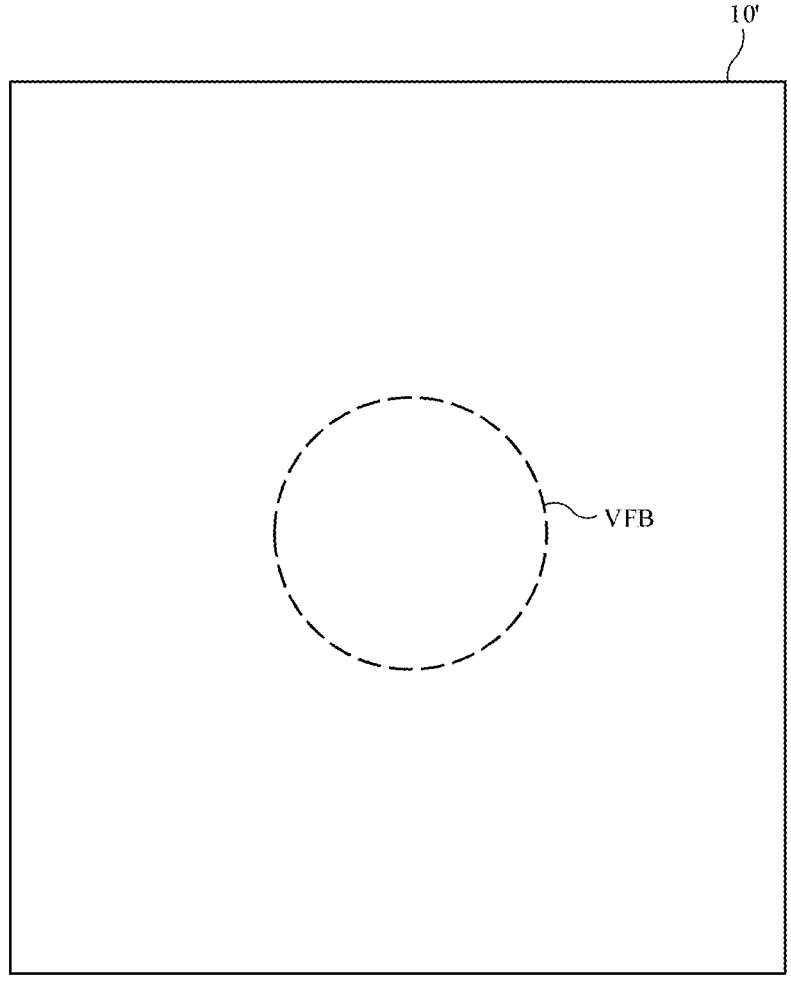
FIG. 8 is a diagram showing illustrative visual feedback that may be provided to a user to confirm that a target item of interest has been identified in accordance with an embodiment.

If desired, a user may be provided with feedback to confirm when a user has identified an object of interest. A user may, for example, wish to control the output volume of a voice-controlled countertop speaker. To identify the speaker as a target device of interest, the user may look at the speaker. A gaze tracking sensor in a head-mounted device on the user's head may measure the user's point-of-gaze. When it is determined by one or more devices in system 8 that the point-of-gaze is dwelling for more than a predetermined time on the speaker, one or more of the devices in system 8 may direct the head-mounted device to display a visual element (e.g., a highlight) that indicates that the speaker associated with the user's current point-of-gaze has been identified. FIG. 8 shows, for example, how an icon or other visual feedback element VFB may be overlaid on a real-world image of speaker 10'. This technique may be used in connection with identifying any suitable target device of interest in system 8. Moreover, other types of feedback may be provided. For example, a device may provide haptic feedback, audible feedback, and/or visual feedback. Feedback may be provided by the same device that measures user input identifying a target device as being of interest (e.g., a head-mounted device in a scenario in which point-of-gaze pointing input is being used to identify the target device), may be provided by an associated device (e.g., a ring worn by the same user), and/or may be provided by the target device (e.g., the speaker may issue a tone that serve as feedback indicating that the speaker has been identified as a target device of interest). Following receive of feedback in system 8 confirming that a target device of interest has been identified, the user may supply one or more devices 10 with input to control operation of the target device.

Figure 9:
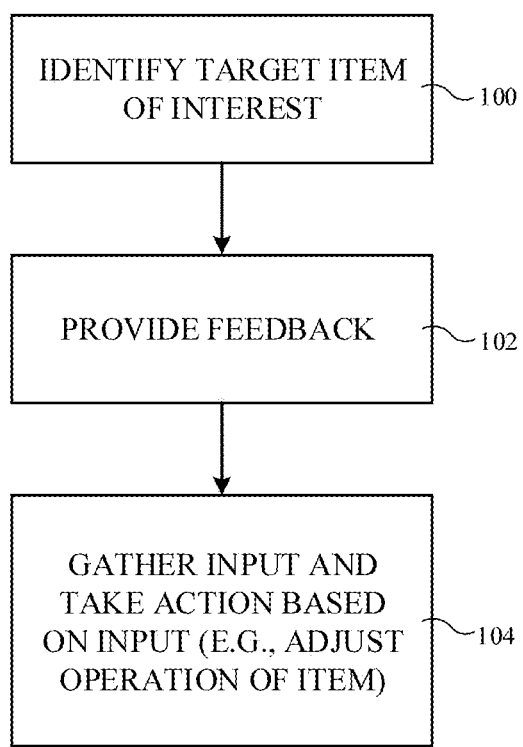
FIG. 9 is a flow chart of illustrative operations involved in using one or more devices in the system of FIG. 7 in accordance with an embodiment.

Illustrative operations involved in using one or more devices 10 in system 8 are shown in FIG. 9.

During the operations of block 100, a user may use device(s) 10 to identify a target item of interest. The target item of interest may be one of devices 10 in system 8.

Consider, as an example, a scenario in which a user of a ring device wishes to control a given electronic device in system 8. The user may use the ring to identify which device out of multiple devices in the user's environment is of interest for controlling. As an example, the user may use the ring to point at the given device. A sensor such as an inertial measurement unit and/or a radio-frequency orientation sensor (e.g., radio-frequency circuitry that gathers angle-of-arrival and/or angle-of-departure information) can be used to determine the direction in which the user is pointing. Circuitry in the ring and the target device may operate cooperatively. For example, each potential target item may emit a wireless signal. The ring may contain circuitry that can identify the emitted wireless signals and that can measure the angle-of-arrival of the emitted signals. Signal strength can also be measured. In this way, the ring and/or other devices in system 8 can determine where potential target devices are located relative to the ring and can determine when a particular target device is being pointed at. Information on which device has been identified in this way may be shared wirelessly between the ring, the target device, and/or other electronic devices in wireless communication in system 8. For example, information on the identified device may be shared between the ring and a head-mounted device, between the ring and a computer, between the ring and a cellular telephone, between the ring and other electronic device(s), etc.

In this way, a ring can be used by a user in identifying a target device of interest. Other techniques for using a ring to identify a target device of interest may also be used. For example, a user may make a finger gesture or hand gesture in which the ring is moved in a three-dimensional path through the air. The path may have a particular pattern that identifies a device of interest (e.g., a circular path shape to identify a television as being a device of interest, a triangular path shape to identify a countertop speaker as being a device of interest, etc.) or the path may be oriented in the direction of a target device of interest (e.g., the gesture may form a pointing path that is oriented towards the target device and that therefore serves to point toward the target device).

When the user is using a head-mounted device or other device with gaze tracking capabilities, the user may supply input to identify a target item of interest using the user's eyes. The user may, as an example, gaze at a particular target item (e.g., a television, speaker, computer, household appliance, etc.). A gaze tracking sensor in the head-mounted device may detect that the user has gazed at the particular target item for more than a predetermined time and may therefore conclude that the target item is of interest to the user. Voice commands, touch sensor input, force sensor input, button press input, and/or other user input to the sensor(s) of the input-output circuitry of one or more devices in system 8 may be used by the user in identifying which item is of interest. In some scenarios, pointing input from one device is used in combination with other types of user input from the same device or another device. For example, a user may point at a target item with a ring device, may gaze at the target item of interest with the user's eyes, may point a head-mounted device at the target item, or may otherwise point at the item. In addition to or instead of pointing at the item for more than a predetermined threshold amount of time, the user may supply additional input to indicate interest in the item being pointed at. For example, the user may press a touch sensor or force sensor, may supply voice input (e.g., a vocal "select" command), may tap, supply an air gesture, supply a fingerprint or other biometric input, and/or may otherwise supply additional input to confirm to system 8 that the item being pointed to is in fact a target item of interest.

During the operations of block 102, it may be desirable for system 8 to provide a user with feedback in response to user identification of a target item of interest. Consider, as an example, a scenario in which a user identifies a countertop voice-controlled speaker in the user's environment at being a target item of interest. To help avoid potential user confusion as to which item has been identified as being of interest, the user may be provided with visual feedback, audio feedback, haptic feedback, and/or other feedback that confirms to the user that the speaker has been identified. As an example, if the user is wearing a head-mounted device, the display of the head-mounted device may create visual feedback in the form of an icon, halo, or other visual feedback element that visually highlights the speaker (see, e.g., visual element VFB which has been overlaid over speaker 10' in the example of FIG. 8).

During the operations of block 102, a head-mounted device may use information from a front-facing camera, orientation sensor, radio-frequency circuitry, and/or other sensor circuitry in identifying the location of target item relative to the head-mounted device. As an example, a colored computer-generated visual element may be overlaid on top of the real-life image of the speaker or a halo may be displayed that surrounds the speaker based at least partly on information of the location of those items that is gathered using a camera in a head-mounted device. As the user views the speaker through the head-mounted device, the visual feedback element provides the user with visual information indicating that the system (e.g., the device(s) being used by the user and the target device) are aware that the target device has been selected by the user and is ready to be controlled by the user.

As another example, target device identification feedback may be provided audibly (e.g., the target device, the user's ring device or other wearable device, the user's computer, cellular telephone, or other portable device, and/or other device(s) 10 in system 8 may emit synthesized voice indicating that the target device has been identified, the target device itself may signal that it has been identified by emitting a sound through a speaker in the target device, etc.).

In addition to visual and audible feedback, haptic feedback may be provided. For example, a user with a ring device may receive haptic feedback when the ring device is pointed towards a target device that is being identified by the user or a head-mounted device may supply haptic output when a user gazes at a target device for more than a predetermined time or identifies the target device as being of interest by gazing at the target device while supplying other input.

The presentation of feedback during the operations of block 102 is optional. For example, a user may identify a target item of interest by gazing at a particular item for more than a predetermined amount of time and no visual, audio, and/or haptic feedback may be supplied specifically in response to this identification. In other scenarios, multiple types of feedback may be provided (e.g., audible, visual, and/or haptic feedback may be provided in response to identifying a target item of interest).

If desired, the operation of a target device may be automatically adjusted in response to being identified by the user. For example, a light may be turned on automatically in response to being identified as a target item of interest by the user. In this type of scenario, no further input is needed to adjust the operation of the target item.

As another example, device 10 (e.g., a head-mounted device, a speaker device such as a pair of headphones or earbuds, or other wearable device) may be used to automatically adjust which device in the user's environment is being used to provide an audio stream to a countertop speaker, a speaker in head-mounted device, a speaker in the headphones or earbuds, or other speaker in system 8. When, for example, a user gazes at a television (or set-top box associated with the television), the television (and/or set-top box) may automatically wirelessly transmit its audio stream for playback on the speaker. In response to gazing at a computer, in contrast, the computer may automatically wirelessly transmit its audio stream for playback on the speaker. In this way, the user may control the audio source being played in real time by directing their gaze at a device of interest.

In another illustrative scenario, the user may be using device(s) 10 in a system that includes a television or computer with an automatic screen saver. The user may unlock the screensaver on the television, computer, or other device by identifying that device as a target device of interest (e.g., by gazing at the device while the user is wearing a head-mounted device with a gaze tracking system, by pointing at the device or otherwise identifying the device of interest using a ring, etc.). If desired, the user may be prompted for further authentication information as part of this process. For example, the user may be instructed to place a fingertip on a fingerprint sensor on a ring device to provide fingerprint authentication before the device with the screensaver is unlocked. Screensavers may, in general, be disabled or enabled in this way. Other forms of authentication (e.g., gathering of voice print data, retinal scan data, iris scan data, palm print data, and/or other biometric data) may also be used by device(s) 10 in system 8 before the screensaver is removed or other sensitive operations are performed (revealing health information, unlocking doors or other equipment, making payments and/or releasing financial information, etc.). For example, a computer, television, or other device in system 8 may be unlocked (and a screensaver removed from the display of the device) only after 1) the user looks at the computer (so that the gaze tracker in the user's head-mounted device identifies the computer as a target item of interest) and 2) the head-mounted device captures a retinal scan and authenticates the user by providing the retinal scan to the computer for verification.

After identifying a target device as being of interest, the operation of the target device may be adjusted in response to additional user input. Additional user input may, for example, be gathered during the operations of block 104 and may be used in adjusting the operation of the target device in real time.

The additional input gathered during the operations of block 104 may, as an example, include touch sensor input, force sensor input, fingerprint input, eye input (e.g., point-of-gaze input and/or retinal scan input), voice input, and/or other user input gathered from one or more sensors in one or more devices 10 being used by the user. This additional input may then be used in controlling the target item of interest (e.g. one or more of those devices 10 and/or one or more additional devices 10 in system 8).

For example, if the user identified a speaker as being of interest, user input from a ring device, head-mounted device, cellular telephone, computer, or other device may be used to adjust the output volume of the speaker, the content source that supplies content to the speaker, and/or other speaker operating settings. Consider, as an example, a user with a ring device having a touch sensor. The user may move the user's finger in first or second opposing directions along the circumference of the ring. A touch sensor that wraps around the ring may gather the user's finger input. When the user moves the finger in the first direction, the input gathered from the ring may be used to direct the speaker to increase the playback volume. When the user moves the finger in the second direction, the input gathered from the ring may be used to direct the speaker to lower the playback volume.

Other operational parameters (e.g., media track selection, source selection, etc.) may also be made in response to the user input that is gathered during the operations of block 104. Because a ring device can be worn by a user all day, the ring device may be readily accessible to the user when the user desires to control the target item. Moreover input to a ring device may be less conspicuous than voice control input in some scenarios (e.g., when near other people in public).

If desired, voice commands and commands made to non-ring devices may be gathered during block 104. For example, user input may be gathered such as gaze tracking input, head-mounted device orientation input, button press input, voice input, touch sensor input, force sensor input, input from three-dimensional image sensors and other image sensors (outwardly facing and inwardly facing), input gathered by one or more sensors in a head-mounted device (e.g., a head-mounted device with or without a front-facing camera or other camera that captures images of the user's surroundings and/or a head-mounted device with speakers that provide audio to a user's ears without preventing ambient sounds from reaching the user's ears), voice input and/or other remote control input (e.g., volume up and volume down input from a handheld remote control device or other equipment in a television system), face recognition input, other image sensor input, finger print input, button input, force sensor input, touch sensor input, and/or other input from sensors in a computer, tablet, and/or cellular telephone, etc.

In general, any input gathered during block 104 may be used in controlling the item that was identified as being of interest during the operations of block 100. An electronic device in system 10 may also operate autonomously or nearly autonomously (e.g., for health monitoring). In some scenarios, device 10 may operate as an authentication device. For example, when device 10 comes within range of a near-field communications item (e.g., a computer with near-field communications circuitry, a door lock with near field communications circuitry, a point-of-sale terminal with near-field communications circuitry, etc.), device 10 (e.g., a ring) may provide a user with an alert (e.g., haptic output). The user may then press a fingertip against surface 42. The fingerprint reader at surface 42 may gather the user's fingerprint and thereby authenticate the user. Near-field communications circuitry in device 10 may then send authentication information and/or other information (e.g., a door unlock command, payment command, etc.) to the near-field communications item (e.g., the computer, point-of-sale device, door, or other near-field communications device being controlled).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). a person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. An electronic ring configured to be worn on a finger of a user in a system that has a head-mounted device with a gaze tracking sensor and that has first and second electronic devices, wherein the gaze tracking sensor is configured to detect a user's point of gaze, the electronic ring comprising:
   a ring-shaped housing;
   a sensor in the ring-shaped housing that is configured to gather pointing input; and
   control circuitry in the ring-shaped housing that is configured to:
      control the first electronic device using the pointing input when the point of gaze aligns with the first electronic device; and
      control the second electronic device using the pointing input when the point of gaze aligns with the second electronic device, where in the second electronic device comprises a speaker and wherein a volume of audio being played by the speaker is adjusted in response to the pointing input.

2. The electronic ring defined in claim 1 wherein the sensor comprises a radio-frequency orientation sensor.

3. The electronic ring defined in claim 1 further comprising a biometric sensor configured to gather biometric information.

4. The electronic ring defined in claim 3 wherein the first electronic device is unlocked based on the biometric information.

5. The electronic ring defined in claim 4 wherein the biometric information comprises a fingerprint of the user and the biometric sensor comprises a fingerprint sensor configured to detect the fingerprint of the user.

6. The electronic ring defined in claim 1 further comprising an audio output device configured to provide audible feedback indicating that the first electronic device has been identified.

7. The electronic ring defined in claim 1 further comprising a haptic output device configured to provide haptic output indicating that the first electronic device has been identified.

8. The electronic ring defined in claim 1 wherein the sensor is configured to detect gesture input, the first electronic device comprises a display, and the control circuitry is configured to control the display in response to the gesture input.

9. An electronic ring configured to operate in a system that has a head-mounted device with a gaze tracking sensor configured to detect a user's point of gaze, the electronic ring comprising:
   a housing configured to be worn on a body part of the user;
   a sensor in the housing that is configured to gather gesture input; and
   control circuitry in the housing that is configured to:

control a first electronic device based on the gesture input when the point of gaze aligns with the first electronic device; and
      control a second electronic device based on the gesture input when the point of gaze aligns with the second electronic device, wherein the second electronic device comprises a speaker and wherein audio from the speaker is adjusted in response to the gesture input.

10. The electronic ring defined in claim 9 wherein the sensor is selected from the group consisting of: an accelerometer, a touch sensor, and a force sensor.

11. The electronic ring defined in claim 9 wherein the sensor is configured to wrap around at least some of the housing.

12. The electronic ring defined in claim 9 wherein the body part of the user is a finger of the user and the gesture input comprises a gesture from the finger of a user in a path through the air.

13. The electronic ring defined in claim 9 wherein the body part of the user is a hand of the user and the gesture input comprises a gesture from the hand of the user in a path through the air.

14. The electronic ring defined in claim 9 wherein the first electronic device comprises a display and the control circuitry is configured to launch an application on the display in response to the gesture input.

15. The electronic ring defined in claim 9 wherein the gesture input is selected from the group consisting of: a one-dimensional touch input, a two-dimensional touch input, and a multitouch input.

16. The electronic ring defined in claim 9 wherein the sensor comprises a radio-frequency orientation sensor.

17. A ring device configured to operate in a system with a head-mounted device having a gaze tracking sensor configured to measure a user's point of gaze, the ring device comprising:
   a ring-shaped housing configured to be worn on a finger of the user;
   a motion sensor in the ring-shaped housing that is configured to gather gesture input; and
   control circuitry in the ring-shaped housing that is configured to:
      control audio from a speaker in response to the gesture input when the point of gaze aligns with the speaker; and
      control display content on a display in response to the gesture input when the point of gaze aligns with the display.

18. The ring device defined in claim 17 wherein the gesture input is selected from the group consisting of: pointing input, tap input, and multitouch input.

19. The ring device defined in claim 17 wherein the control circuitry is configured to adjust a volume of the audio from the speaker in response to the gesture input, the ring device further comprising a haptic output device configured to provide haptic output in response to the gesture input.

* * * * *